United States Patent

[11] 3,599,532

[72] Inventor Kingo Matsui
428, Takaoka-cho, Hamamatsu-shi, Japan
[21] Appl. No. 838,711
[22] Filed July 2, 1969
[45] Patented Aug. 17, 1971
[32] Priority July 17, 1968
[33] Japan
[31] 43/50136

[54] APPARATUS FOR ACCURATELY POSITIONING THE MOVABLE TABLE OF A MACHINE TOOL
3 Claims, 7 Drawing Figs.

[52] U.S. Cl. .................................................. 90/58 R,
29/65, 82/34 A
[51] Int. Cl. .................................................. B23d 7/08
[50] Field of Search .......................................... 74/816,
815, 821, 826, 813; 29/65; 72/30; 82/34 A; 90/51, 58

[56] References Cited
UNITED STATES PATENTS
1,946,835 2/1934 Buhr .............................. 74/816
3,412,633 11/1968 Huntley ......................... 74/821
3,485,115 12/1969 Gates ............................ 74/815

Primary Examiner—Milton Kaufman
Assistant Examiner—F. D. Shoemaker
Attorney—George B. Oujevolk ABSTRACT: An apparatus for accurately positioning the table of a machine tool comprising a member on the table having a contact surface and a member on the bed having a receiving surface, the member on the bed being movable into and out of position wherein it can engage the member on the table and being rotatable about a vertical axis, one of said members being free to rock about a horizontal axis perpendicular to the axis of motion of the table. The contact surface and receiving surface meet in surface-to-surface contact thus controlling the positioning of the table with respect to the bed.

INVENTOR
Kingo Matsui

BY George B. Oujevolk
ATTORNEY

APPARATUS FOR ACCURATELY POSITIONING THE MOVABLE TABLE OF A MACHINE TOOL

This invention relates to an apparatus for accurately positioning the movable table of a machine tool.

In a machine tool or the like with an apparatus for accurately stopping the movable member (hereafter referred to as "the table") at a predetermined position on the fixed member (hereafter referred to as "the bed") the movable table by its great weight imparts a large shock to the contact surface between the bed and the table at the moment it stops, even if its velocity has been retarded considerably. The contact face receiving this shock is generally a conical frustum projecting from the bed into a hole in the table. Because of these shocks the conical contact surface rapidly wears and deforms so that there is a loss in the degree of accuracy with which the table is stopped and accordingly a loss in the accuracy of work done (The movable member referred to is defined to include rotating members).

The main object of this invention is to provide two members, one on the bed and one on the table, which come into surface-to-surface contact so as to accurately stop the table by means of the uniformly distributed surface pressure between the members and thus to greatly improve the accuracy of work performed.

Another object of this invention is to provide a device for accurately stopping the table wherein, of the two members which come into surface-to-surface contact, either the one mounted on the table or the one mounted on the bed is free to rock up and down with respect to the motion of the table and wherein the bed member is free to rotate about an axis perpendicular to the plane movement of the table so that the contact surface of the table member automatically comes into a state of surface-to-surface contact with the receiving surface of the bed member so that even when there is a misalignment between the surfaces, the pressure between them is uniformly distributed thus preventing local abrasion and deformation of the contact surface and/or the receiving surface.

These and other objects and advantages of the present invention will become apparent from the description of preferred examples in reference to the attached drawing in which:

FIG. 5 is a schematic view.

FIG. 6 and 7 are sectional views along line VI–VI and line VII–VII in FIG. 5 respectively.

Figure 1:
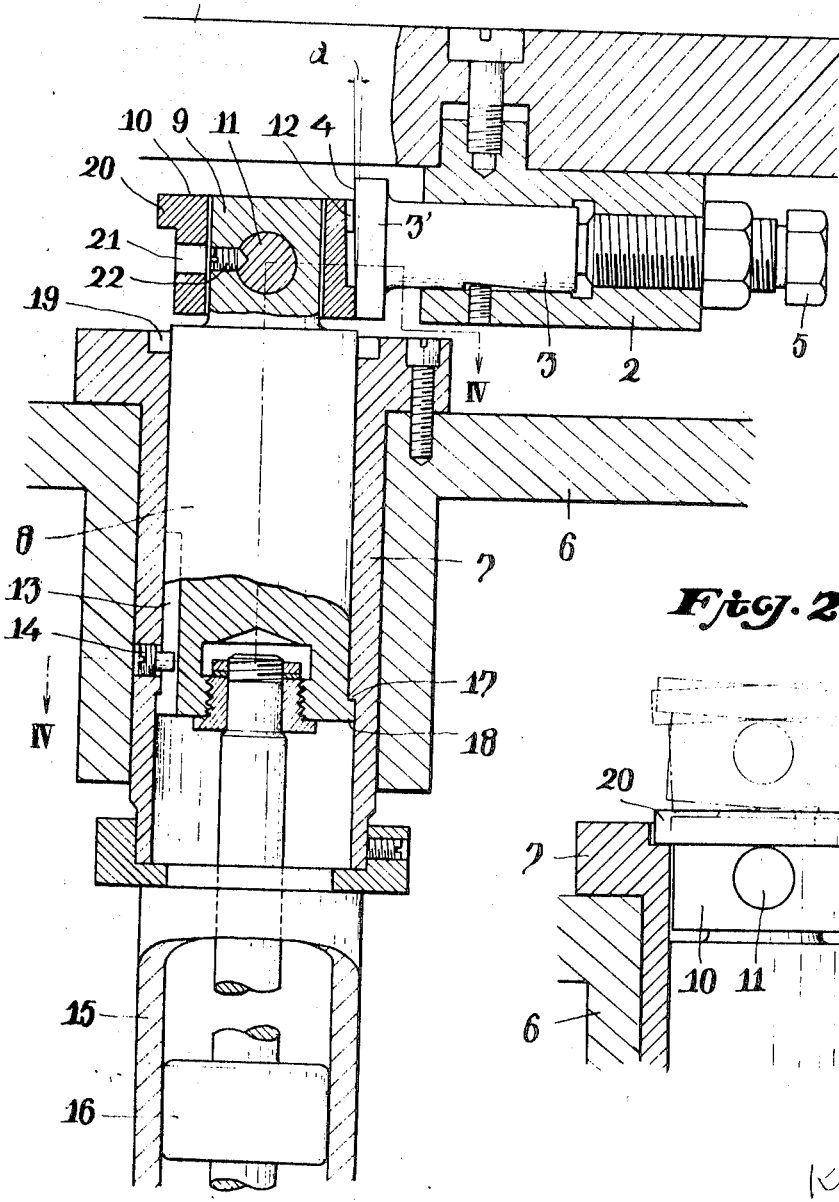
FIG. 1 is an elevational section illustrating the positioning operation with the fixed member and the movable member at the determined position.
Figure 2:
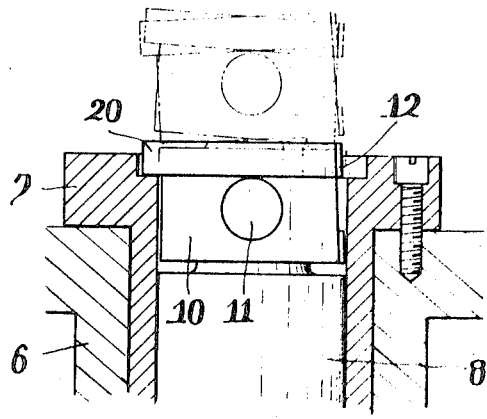
FIG. 2 is an illustrative drawing of the butt member of the fixed member in the inoperative position.
Figure 3:
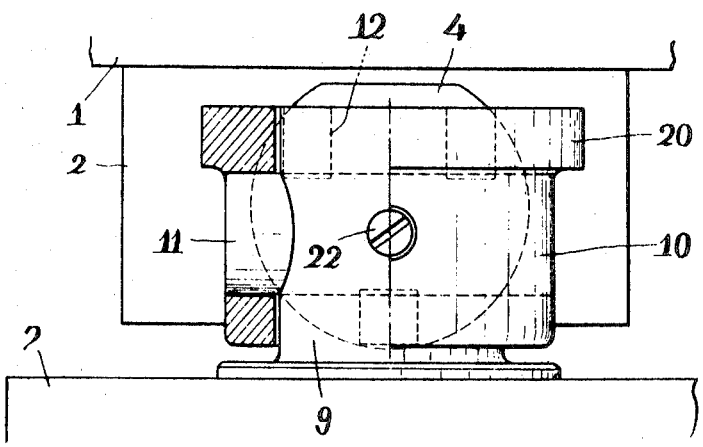
FIG. 3 is a front view of a portion of the arrangement shown in FIG. 1 when the stopper flange is cut by a half section.
Figure 4:
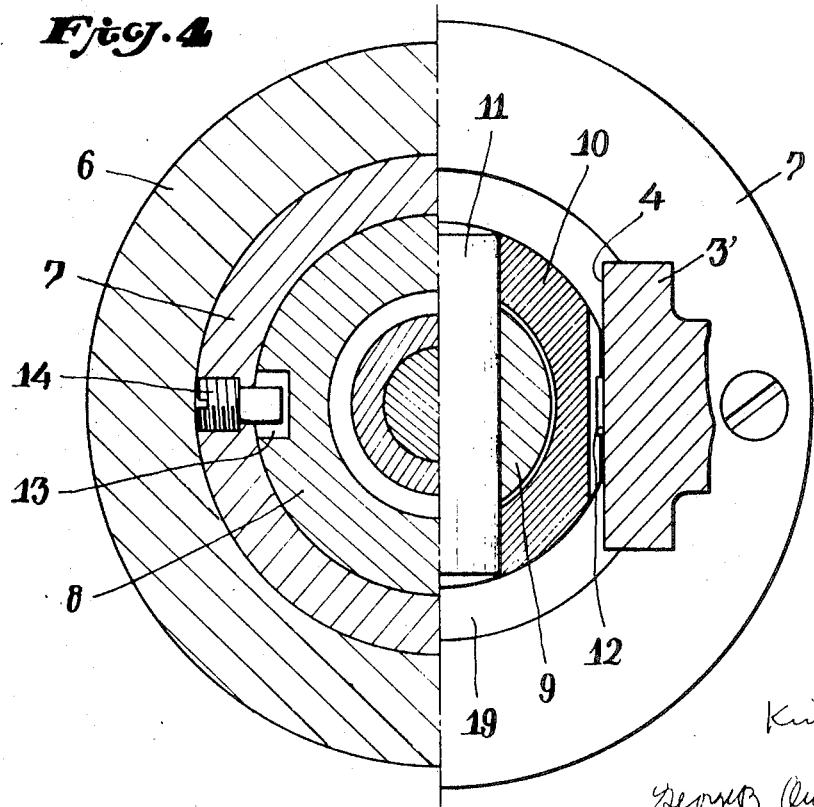
FIG. 4 is a sectional view along line IV–IV in FIG. 1.

Referring now to the drawing, particularly, to FIGS. 1 through 4, a holder 2 mounted on the bottom of table 1 clamps stopper member 3. Part 3', which has the contact surface 4, projects beyond one end of holder 2. In general, contact surface 4 is perpendicular to the direction of motion of a linearly moving table and lies parallel to the direction of the radius of a rotating table. Adjusting screw 5 is mounted in the tail end of holder 2 and serves to advance and retract stopper member 3 inside holder 2.

Bed 6 which slidably supports table 1 to control the movement thereof has mounted vertically thereon a guide sleeve 7 in which a supporting shaft 8 is slidably inserted. Neck 9 at the top of supporting shaft 8 loosely holds annular butt member 10. Axle 11 perpendicular to supporting shaft 8 supports butt member 10 so as to permit it to rock freely about neck 9. Accordingly butt member 10 can rock up and down about axle 11 within the limits allowed by neck 9 (see FIG. 2). Butt member 10 has on its outer surface receiving surface 12 running parallel to the axis of axle 11. The receiving surface 12 is disposed substantially opposite to contact surface 4 of stopper member 3 and maintained in this position since keypin 14 planted into guide sleeve 7 enters groove 13 running lengthwise of supporting shaft 8 and thus holds butt member 10 in such a manner that receiving surface 12 is generally opposite to contact surface 4 on stopper member 3.

Since the width of said groove 13 is larger than the diameter of the part of keypin 14 which enters groove 13, supporting shaft 8 can rotate about its axis inside guide sleeve 7 within the limits allowed by keypin 14 and groove 13.

The bottom end of supporting shaft 8 is directly connected to piston 16 of piston-type actuator 15, or otherwise connected to a linear or rotary actuator through a rack and pinion. By changing the direction of the actuator, the supporting shaft 8 ascends or descends inside guide sleeve 7. In the upper position, butt member 10 is in position to receive stopper member 3, whereas in the lower position, the butt member is not in a position to engage stopper member 3. Step 17 is provided near the bottom of guide sleeve 7 to limit the upmost position of supporting shaft 8. This step receives shoulder 18 at the bottom of supporting shaft 8. Step 19 which is formed on the top edge of the aperture of guide sleeve 7 receives flange 20 on butt member 10 when supporting shaft 8 descends thus limiting the bottommost position of supporting shaft 8. So that butt member 10 can be removed from neck 9 of supporting shaft 8, the butt member 10 is provided with hole 21 through which screw 22 is passed to enter neck 9 and axle 11. When screw 22 is retracted, axle 11 can be extracted longitudinally from neck 9 and butt member 10.

As screw 22 prevents the rocking movement of butt member 10 if located within the hole 21, no part of screw 22 should remain inside hole 21 when the screw has engaged axle 11.

In the embodiment shown, receiving surface 12 is divided into three surfaces. These may, however, be combined into one surface.

Conventional methods are employed for switching the hydraulic pressure to the actuator when butt member 10 is brought into position to receive stopper member 3 and stop table 1 and when butt member 10 is lowered from the receiving position in order to resume the movement of the table after having finished the work.

Butt member 10 is free to rock up and down with regard to neck 9 of supporting shaft 8 and support shaft 8 is free to rotate about its axis within the limits of groove 13 and keypin 14. Therefore, when receiving surface 12 receives stopper member 3, said receiving surface automatically swings into the proper alignment for surface-to-surface contact with contact surface 4. Accordingly, the impact caused by stopping the table is uniformly received by both surfaces 4 and 12. As uneven contact and abrasion are eliminated, even frequent stopping actions do not cause any fluctuation in the stop position and thus use over prolonged periods becomes possible.

Figure 5:
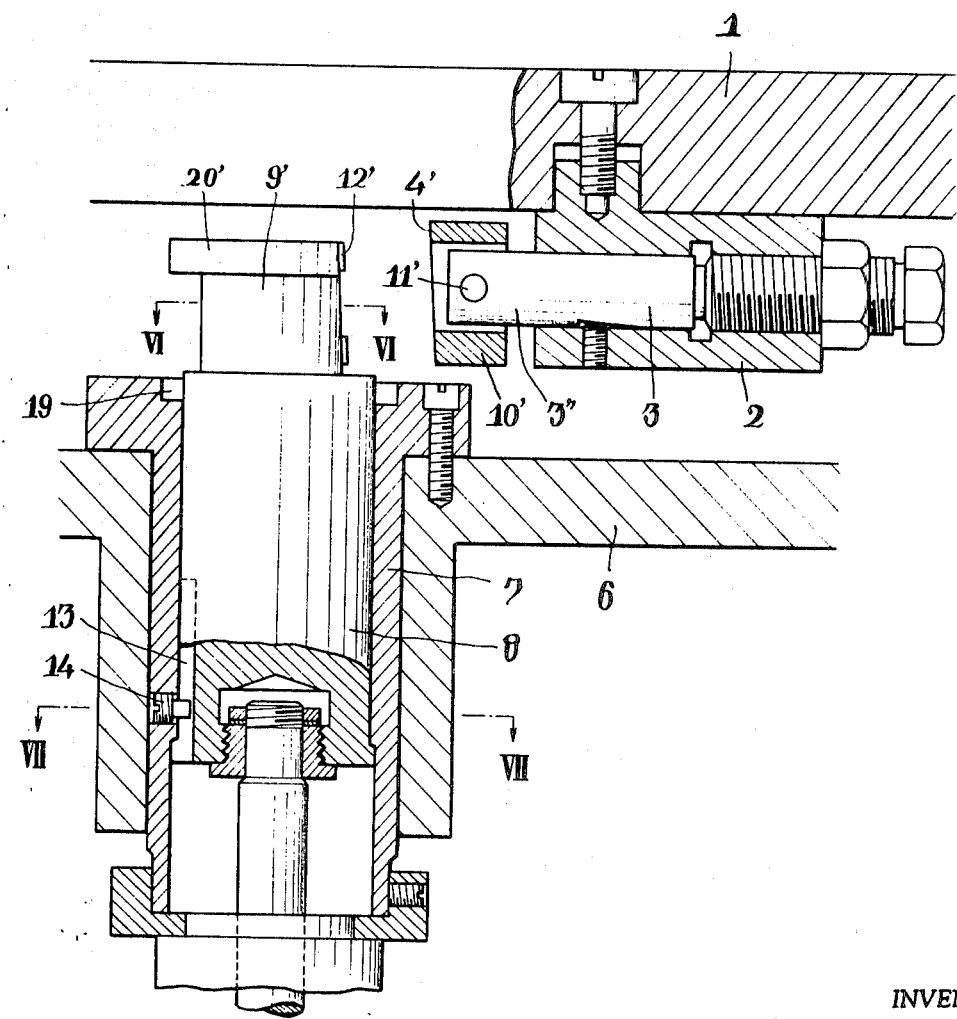
FIG. 5 to 7 show an alternative example.
Figure 6:
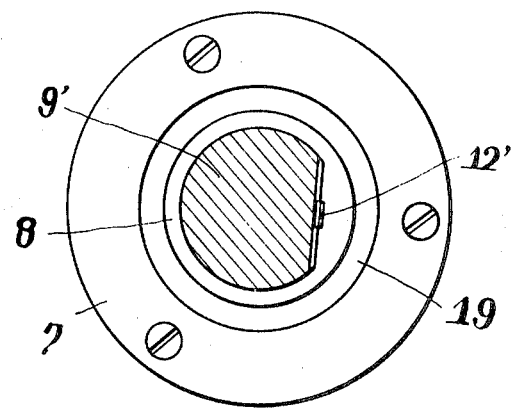
Figure 7:
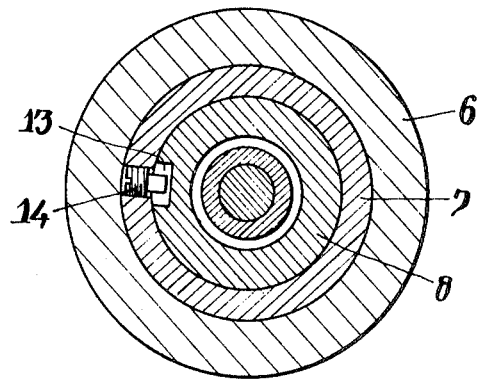

The example indicated in FIGS. 5–7 presents a variation of the first example. In this embodiment annular butt member 10' is lifted loosely over tip 3" of stopper member 3 projecting from holder 2 and supported by axle 11' in such a manner that it is free to rock up and down with respect to the direction of motion of the table, said rocking being within the limits allowed by the difference in the outside diameter of tip 3" and the inside diameter of annular butt member 10'. Contact surface 4' is formed on the outer edge of annular butt member 10', and receiving surface 12' which is to receive said contact surface 4' in surface-to-surface contact is provided on upper portion 9' of supporting shaft 8. Supporting shaft 8 is, of course, slidably held by guide sleeve 7 and can be moved in and out of a position in which upper position 9' engages butt member 10'. Supporting shaft 8 is further free to rotate about its axis within guide sleeve 7 within the limits allowed by groove 13 and key pin 14. Step 19 is provided in the top edge of the aperture of guide sleeve 7 so as to receive flange 20 and limit the bottommost position of supporting shaft 8.

As in previous embodiment, since supporting shaft 8 which has receiving surface 12' is free to rotate about its axis and since annular butt member 10' which has contact surface 4' is loosely held by stopper member 3 and pivoted so as to be free to rock by axle 11' which lies perpendicular to the axis of supporting shaft 8 and to the direction of motion of the table (to the radius in the case of a rotating table), contact surface 4' on the table side and receiving surface 12' on the bed side mutually and automatically align themselves into surface-to-surface contact and in this condition stop the table. Receiving surface 12' is provided with an extration angle as in the previous example and it too may be divided into three surfaces.

I claim:

1. In a machine tool wherein a horizontal longitudinal table moves across a horizontal bed, an arrangement for accurately positioning the table comprising;
   a. a holder piece (2) mounted on the table bottom including a first member (3) with a vertical contact face (3') and adjusting means (5) for adjusting the longitudinal position of said contact face (3');
   b. a vertical guide sleeve (7) in said bed (6) having a shaft (8) slidably inserted therein with a neckpiece (9) at the upper portion thereof disposed to move into and extend out of said guide sleeve (7);
   c. a second member (10) held on said neck with a receiving surface (12);
   d. a horizontal axle (11) on one of said pieces, so that the corresponding member thereon is loosely held and free to rock about said neck so as to ensure surface to surface contact between said first and second members; and,
   e. piston means (16) to move said second member (10) into and out of said guide sleeve (7), limit stop means (17, 18) on said shaft and guide sleeve limiting the upward movement of said shaft and key means (14) to lock said shaft into position, whereby said receiving surface and contact surface meet in surface-to-surface contact, thus controlling the position of said bed.

2. An arrangement as described in claim 1, said axle being on said neck, said first member is loosely fitted on said neckpiece.

3. An arrangement as described in claim 1, said axle (11' being on said holder piece, said first member contact and surface (4' loosely fitted thereon.